(12) United States Patent
Hara

(10) Patent No.: US 7,336,379 B2
(45) Date of Patent: Feb. 26, 2008

(54) METHOD, SYSTEM, AND RECORDING MEDIUM FOR ORDERING PRINTS

(75) Inventor: Makoto Hara, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 689 days.

(21) Appl. No.: 09/968,890

(22) Filed: Oct. 3, 2001

(65) Prior Publication Data
US 2002/0049794 A1   Apr. 25, 2002

(30) Foreign Application Priority Data
Oct. 3, 2000 (JP) .............................. 2000-303868

(51) Int. Cl.
*G06F 3/12* (2006.01)
*G06K 15/00* (2006.01)
(52) U.S. Cl. ............... 358/1.15; 358/1.16; 358/1.1
(58) Field of Classification Search ............... 358/1.15, 358/487, 302, 1.16, 1.17, 1.18, 1.1, 1.6, 1.9, 358/1.11, 1.13, 1.14, 402, 403, 404, 407, 358/468, 444, 448; 707/527; 705/40; 715/527; 709/201, 203
See application file for complete search history.

(56) References Cited

U.S. PATENT DOCUMENTS

| | | | | |
|---|---|---|---|---|
| 5,974,401 A | * | 10/1999 | Enomoto et al. | 705/40 |
| 6,324,521 B1 | * | 11/2001 | Shiota et al. | 705/27 |
| 6,512,570 B2 | * | 1/2003 | Garfinkle et al. | 355/40 |
| 6,657,702 B1 | * | 12/2003 | Chui et al. | 355/40 |
| 6,798,531 B1 | * | 9/2004 | Paz-Pujalt et al. | 358/1.15 |

\* cited by examiner

*Primary Examiner*—Dov Popovici
(74) *Attorney, Agent, or Firm*—Birch, Stewart, Kolasch & Birch, LLP

(57) ABSTRACT

At the time of ordering a print of image data via a network, agency information is input without carrying out a troublesome operation. Image data obtained by reading a film at a DPE store are written in a CD-R together with agency information representing the DPE store. By using a user terminal, a user orders the print of the image data written in the CD-R from a printing-order reception center. Upon ordering the print, the agency information written in the CD-R is transferred to an order reception server. After the print is generated, the printing-order reception center delivers the print to the agency represented by the agency information.

28 Claims, 21 Drawing Sheets

FIG.6

| NAME | J-CHAIN AOBADAI |
|---|---|
| ZIP CODE | 010-0900 |
| ADDRESS | 3RD FLOOR MIDORI-BUILDING,1-1-1 AOBA-KU YOKOHAMA,KANAGAWA |
| PHONE NUMBER | 045-222-2222 |
| FAX NUMBER | 045-222-3333 |
| OFFICE HOURS | A.M.9:00 ~ P.M.9:00 |
| MEMO | |

IS THE STORE BELOW APPROPRIATE TO RECEIVE THE PRINTS ?

12 — (GO TO NEXT ⟹)  SELECT THIS STORE

13 — (GO TO NEXT ⟹)  SEARCH FOR ANOTHER STORE

FIG. 8

THE AGENCY CAN SELECTED BY USING AN ADDRESS CODE
OR A STORE CODE

PREFECTURE SELECTION
KANAGAWA ▼
14
OK

● IF YOU WISH TO SEARCH FOR THE AGENCY
BASED ON AN ADDRESS
1. SELECT A PREFECTURE
2. CLICK "OK"
＊A LIST OF MUNICIPALITIES IN THE SELECTED
PREFECTURE IS DISPLAYED

STORE CODE
☐-☐-☐
15
OK

● IF YOU WISH TO DIRECTLY INPUT A STORE CODE
1. INPUT A STORE CODE IN 3 BOXES ON THE LEFT
2. CLICK "OK"

FIG.9

SELECT A MUNICIPALITY

| KANAGAWA |
|---|
| YOKOHAMA |
| KAWASAKI |

FIG.10

SELECT A AGENCY

| STORE NAME | ADDRESS | PHONE NUMBER | OFFICE HOURS |
|---|---|---|---|
| J-CHAIN AOBADAI | 3RD FLOOR MIDORI-BUILDING, 1-1-1 AOBA-KU YOKOHAMA, KANAGAWA | 045-222 -2222 | A.M.9:00 ~P.M.9:00 |
| YANAGIDA CAMERA | 7TH FLOOR BENEX S-1 3-18-20 SHINYOKOHAMA KOHOKU-KU YOKOHAMA, KANAGAWA | 045-475 -2623 | A.M.9:00 ~P.M.4:30 |

FIG.11

IMAGE ARE UPLOADED

| | 61 | 62 | |
|---|---|---|---|
| IMAGE 1 | | REFERENCE | |
| IMAGE 2 | | REFERENCE | |
| IMAGE 3 | | REFERENCE | |
| IMAGE 4 | | REFERENCE | |
| IMAGE 5 | | REFERENCE | |
| IMAGE 6 | | REFERENCE | |
| IMAGE 7 | | REFERENCE | |
| IMAGE 8 | | REFERENCE | |
| IMAGE 9 | | REFERENCE | |
| IMAGE 10 | | REFERENCE | |

(CONFIRM IMAGES) 16    (UPLOAD IMAGES) 17

FIG. 13

| CHARGES | DSC SIZE | ¥50 | + AN INITIAL CHARGE OF ¥500 |
| | DSCW SIZE | ¥180 | |
| | L SIZE | ¥50 | |
| | 2L SIZE | ¥80 | |

| No. | PREVIEW BY CLICKING ON AN IMAGE | FILE NAME | PRINT SIZE / TIME AND DATE OF UPLOADING | PRINT QUANTITY |
|---|---|---|---|---|
| 001 | | Dscf0024.jpg | L-SIZE PRINT (WITH WHITE MARGIN/WITHOUT ECLIPSE) ▶ 2000/08/31 11:07:16 | 1 |
| 002 | | Dscf0025.jpg | L-SIZE PRINT (WITH WHITE MARGIN/WITHOUT ECLIPSE) ▶ 2000/08/31 11:07:16 | 1 |
| 003 | | Dscf0026.jpg | L-SIZE PRINT (WITH WHITE MARGIN/WITHOUT ECLIPSE) ▶ 2000/08/31 11:07:16 | 1 |
| 004 | | Dscf0027.jpg | L-SIZE PRINT (WITH WHITE MARGIN/WITHOUT ECLIPSE) ▶ 2000/08/31 11:07:16 | 1 |
| 005 | | Dscf0028.jpg | L-SIZE PRINT (WITH WHITE MARGIN/WITHOUT ECLIPSE) ▶ 2000/08/31 11:07:16 | 1 |

(ORDER CONFIRMED)

METHOD, SYSTEM, AND RECORDING MEDIUM FOR ORDERING PRINTS

BACKGROUND OF THE INVENTION

1. Field of the Invention

The present invention relates to a method and a system for ordering a print of image data via a network, and to a computer-readable recording medium storing a program to cause a computer to execute the print ordering method.

2. Description of the Related Art

Digital photograph service systems for carrying out various kinds of digital photograph services have been known. In such a service, photographs obtained by a user are digitized and stored in an image server or recorded in a CD-R to be provided to the user. Furthermore, images photographed by a user with a digital camera are printed and the user can request additional prints of the images. As one form of such a digital photograph service system, a network photograph service system for receiving an order of a print or the like via a network such as the Internet has also been proposed.

In such a network photograph service system, a user installs viewer software in his/her personal computer which acts as a user terminal so that the user can reproduce image data recorded in a CD-R or obtained by using a digital camera. When the user orders a print or the like, the user generates order information describing the content of an order by using an ordering function built in to the viewer software. The user then sends the order information and image data representing an image or images to be printed from the user terminal to an order reception server via a network such as the Internet. The order reception server sends the image data and the order information to a printer server in a laboratory or in a mini-laboratory installed in a store. The printer server prints the image data and generates an additional print, a picture postcard, an album, and the like, based on the order information. In the case where the printer server and the order reception server are located at the same place, printing is carried out immediately after receiving the image data and the order information.

The print or the like generated in the above manner is delivered to an agency designated by the user at the time of ordering the print or the like. In this manner, the user can pay a printing charge and receive the print or the like at the agency.

The "order information" refers to information such as a processing number for specifying the content of a service (such as generation of an additional print or a postcard), an image number specifying a photograph, a print size, quantity of prints, quality of printing paper (such as glossy or non-glossy), thickness of the printing paper, the content of processing, and trimming specification, for example. The order information may further include information regarding a name, an address, a zip code and a phone number of the user.

In such a network photograph service system described above, the user needs to specify the agency for receiving the print or the like when the user orders the print or the like. There are several methods for the user to designate the agency: (1) selecting the desired agency from a list of agencies displayed on the user terminal; (2) selecting area information such as a prefecture by using the user terminal and then selecting the desired agency from a list of agencies in the selected area; (3) displaying a store closest to the user on the user terminal as the agency based on the zip code; and (4) directly inputting a name of the agency from the user terminal, for example.

However, an operation for selecting the agency is troublesome for the user. Especially, in the case where the user has already decided which agency to use, selection of the agency according to the methods (1) to (4) described above is annoying for the user. Furthermore, if the agency is a DPE store, it is difficult for the DPE store to induce the user to designate the store according to the methods (1) to (4), although the DPE store wishes the user to do so.

SUMMARY OF THE INVENTION

The present invention has been conceived based on consideration of the above problems. An object of the present invention is therefore to enable a user to designate an agency for receiving a print without carrying out troublesome operation.

Another object of the present invention is to enable a DPE store to induce the user to designate the store as the agency.

A print ordering method of the present invention is used for a print ordering system comprising an order reception server for receiving an order of a print of image data, and a user terminal connected to the order reception server via a network for ordering the print of the image data from the order reception server. In this system, the image data to be printed are transferred from the user terminal to the order reception server. The print ordering method of the present invention comprises the step of:

transferring agency information, which had been provided to a user in advance regarding an agency for receiving the print, from the user terminal to the order reception server.

The "order reception server" is a server computer installed in a printing-order reception center, for example, specializing in printing-order reception. If a printer is installed in the printing-order reception center, the order reception server is connected directly to the printer. If the printing-order reception center does not have any printers, the order reception server is connected to a printer server installed in a wholesale laboratory or in a mini-laboratory of a DPE store via the network. The DPE store can also serve as the agency.

In the case where the order reception server is connected directly to the printer, the image data can be printed immediately after order reception. Meanwhile, if the order reception server is connected to the printer server via the network, the image data and the agency information are transferred to the printer server after the order reception, and the printer server generates the print.

The "agency information" refers to information indicating a store (a DPE store, a convenience store, or the like) at which the user would like to receive the print. The print is delivered to the agency represented by the agency information, and provided to the user at the agency. The image data may be transferred to the agency indicated by the agency information (if the agency is a DPE store) so that the print can be generated therein.

The agency information is provided to the user by being recorded as magnetic information in a recording medium such as a magnetic card, an IC card, an FD, and a CD-R, or may be printed on a printing medium such as a leaflet, an advertisement, a coupon, and on a backside of a print which has already been provided to the user. Alternatively, the agency information may be provided to the user by being added in a header of an image file (such as a tag of a JPEG file), or by being uploaded to a Web site of a DPE store. In the case of designation of a DPE store as the agency, not only individual DPE stores but also a DPE store group comprising chain stores can be candidates for the agency. Furthermore, a DPE store may have a plurality of agency information assigned thereto in accordance with the content of services. If a plurality of agency information in accordance with the content of services (such as a discount for a specific customer and an A4-size printing service) is available, what kind of service is provided can be easily confirmed by referring to the agency information. Therefore, printing of image data can be carried out efficiently.

Meanwhile, the image data obtained by reading images from a film are conventionally recorded in a CD-R and provided to the user. In such a case, the agency information may be recorded in the CD-R together with the image data. In this case, a DPE store that has recorded the image data in the CD-R records the agency information representing the store itself so that the user can designate the store as the agency at the time of ordering the print.

Not only the image data and the agency information but also viewer software for ordering the print, for manipulating or browsing through the images may also be recorded in the CD-R. In this manner, the user can order the print, manipulate or browse through the images without obtaining the software himself/herself, if the user installs the viewer software in his/her own user terminal.

If the agency information is to be printed on a printed medium, the agency information may be recorded as a bar code or a numerical code thereon. In this case, the user may input the agency information to the user terminal by using input means such as a keyboard and a mouse. Alternatively, the user may input the agency information to the user terminal by reading the agency information printed on the printing medium with a bar code reader or OCR means. Recently, a method of detecting information such as a number and a bar code included in an image photographed by using a digital camera has been proposed. The OCR means may be such a digital camera enabling the detection.

Recording the agency information on the printing medium such as a leaflet and an advertisement enables the user to designate a DPE store charging less or providing a better service as the agency. In this manner, the user can receive better service. Meanwhile, a DPE store can attract the user as a customer designating the store as the agency, and an advertisement effect and thus a profit can be improved.

The user can obtain the agency information from a Web site by downloading the agency information uploaded in the Web site to the user terminal. By obtaining the agency information representing a DPE store or DPE chain stores from the Web site, the user can confirm the content of services and charges at various DPE stores via the Internet, and can select any one of the DPE stores as desired. At the same time, each of the DPE stores can improve an effect of an advertisement using the Web site.

It is preferable for the print ordering method of the present invention to further comprise the step of displaying an order reception Web screen on the user terminal based on information stored in the order reception server (such as an html file or Javascript). By using the order reception Web screen, the user can order the print. In this manner, the user can order the print at any time he/she wishes, through a comparatively easy operation.

It is also preferable for the print ordering method of the present invention to further comprise the step of displaying an agency confirmation Web screen on the user terminal based on the information stored in the order reception server after the user terminal transfers the agency information to the order reception server so that the user can confirm the agency information regarding the agency he/she has selected. In this manner, the user can confirm the agency information he/she has specified and can change the information if necessary.

It is preferable for the print ordering method of the present invention to further comprise the step of displaying a selection Web screen for selecting another store on the user terminal based on the information stored in the order reception server in the case where the agency information is not appropriate, and information of a store selected in the selection Web screen is used as the agency information.

The case where "the agency information is not appropriate" refers to the case where the agency information needs to be changed. For example, the user himself/herself may wish to change the agency information, or the store corresponding to the agency information may not exist as in the case where the transferred agency information is old or erroneously input. Furthermore, a store different from a store that has been input may be displayed on the confirmation Web screen. In such cases, the user needs to change the agency information.

It is also preferable for the print ordering method of the present invention to further comprise the step of transferring order information representing the content of the order to the order reception server.

A print ordering system of the present invention is a system comprising an order reception server for receiving an order of a print of image data and a user terminal connected to the order reception server via a network and for ordering the print of the image data from the order reception server. In this system, the image data to be printed are sent from the user terminal to the order reception server at the time of ordering the print. The system is characterized by that the user terminal transfers agency information, which has been provided to a user in advance regarding an agency to receive the print, to the order reception server.

In the print ordering system of the present invention, the agency information may be recorded together with the image data in a recording medium. In this case, the user terminal reads the image data and the agency information from the recording medium and transfers the image data and the agency information to the order reception server.

In the print ordering system of the present invention, the agency information may be recorded as magnetic information in a recording medium. In this case, the user terminal reads the agency information from the recording medium and sends the agency information to the order reception server.

Furthermore, the agency information may be printed on a printing medium. In this case, the user terminal reads the agency information from the printing medium and sends the agency information to the order reception server.

Moreover, the agency information may be obtained from a predetermined Web server so that the user terminal can send the agency information obtained in the above manner to the order reception server.

The agency information may be a code number representing the agency input from the user terminal.

The agency information may also be added to the image data. In this case, the user terminal reads the agency information added to the image data and sends the agency information to the order reception server.

In the print ordering system of the present invention, the user terminal may display an order reception Web screen based on information stored in the order reception server so that the print can be ordered via the Web screen.

In this case, it is preferable for the user terminal to display an agency confirmation Web screen based on the information stored in the order reception server, after transferring the agency information.

Furthermore, in this case, it is also preferable for the user terminal to receive an input of information representing whether or not the agency information is appropriate. In the case where the agency information is not appropriate, a selection web screen for selecting another store is preferably displayed on the user terminal based on the information stored in the order reception server so that information of a store selected in the selection web screen can be used as the agency information.

In the print ordering system of the present invention, it is preferable for the user terminal to transfer order information representing the content of the order to the order reception server.

A program to cause a computer such as the user terminal to execute the print ordering method of the present invention may be provided by being recorded in a computer-readable recording medium.

In this case, it is preferable for the recording medium to have the agency information recorded therein. Viewer software for manipulating and browsing through the image data may also be recorded in the recording medium and provided to the user.

According to the present invention, the agency information regarding the agency at where the user is to receive the print, which has been provided to the user in advance, is sent to the order reception server. Therefore, the user can designate the agency at where he or she is to receive the print, without carrying out a troublesome operation. In this manner, the print can be ordered easily. Meanwhile, a DPE store can lead the user to designate itself as the agency, by providing the agency information representing the store to the user in advance. In this manner, the DPE store can increase profit.

BRIEF DESCRIPTION OF THE DRAWINGS

FIG. 6 shows an agency confirmation Web screen;

FIG. 8 shows an agency confirmation Web screen;

FIG. 9 shows a municipality selection Web screen;

FIG. 10 shows an agency selection Web screen;

FIG. 11 shows an image uploading Web screen;

FIG. 13 shows an order content input Web screen;

DESCRIPTION OF THE PREFERRED EMBODIMENTS

Hereinafter, embodiments of the present invention will be explained with reference to the accompanying drawings.

Figure 1:
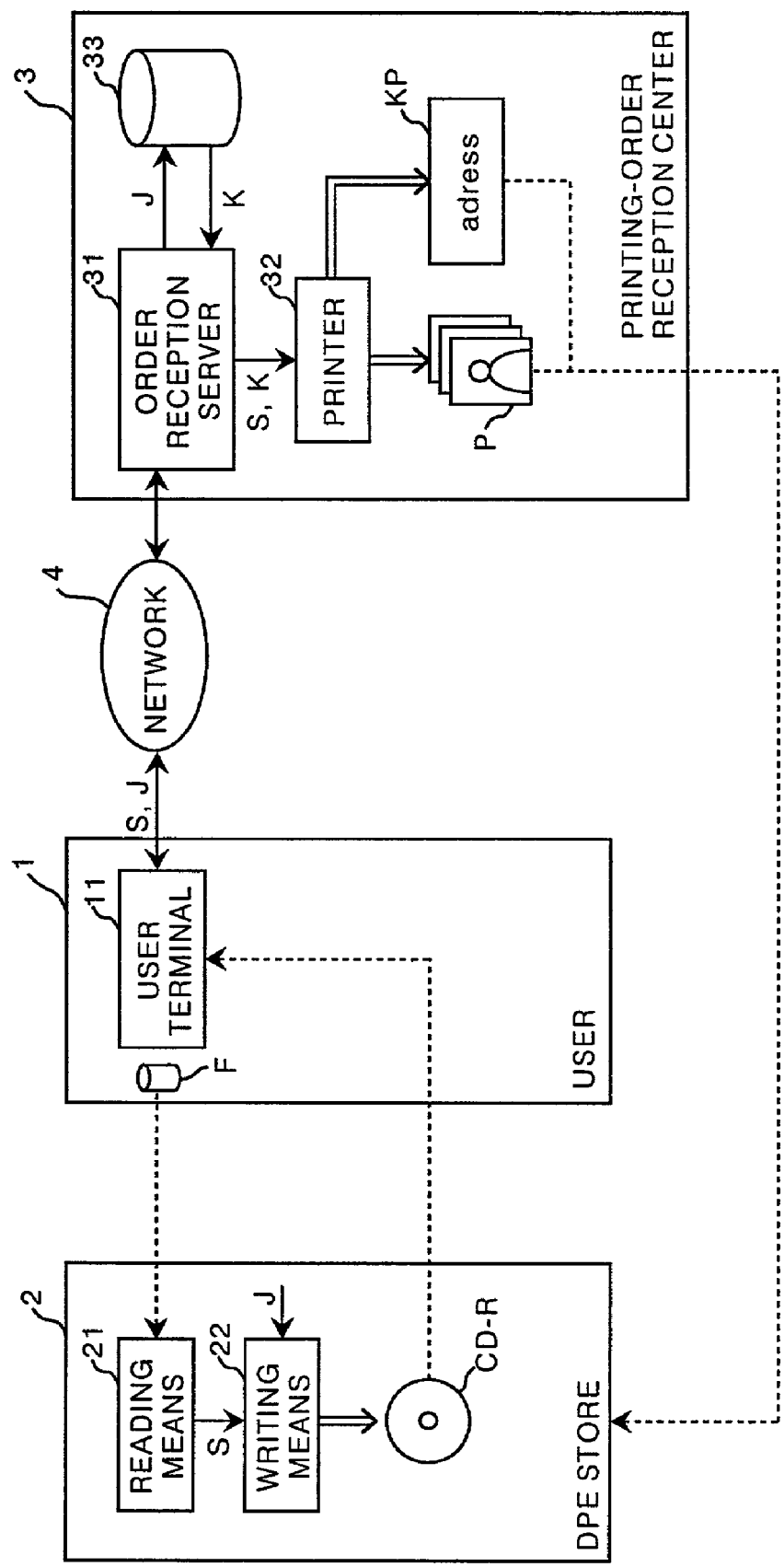
FIG. 1 is a block diagram showing a configuration of a network photograph service system adopting a print ordering system as a first embodiment of the present invention.

FIG. 1 is a block diagram showing a configuration of a network photograph service system adopting a print ordering system as a first embodiment of the present invention. The network photograph service system shown in FIG. 1 exchanges data, prints and the like between a user 1, a mini-laboratory (a DPE store) 2 and a printing-order reception center 3.

The user 1 has a user terminal 11 such as a personal computer, and the user 1 can order a print P or prints P (hereinafter called the prints P) from the printing-order reception center 3 via a network 4. If the user does not have a personal computer, the user 1 can use an order processing terminal installed in a service provider as the user terminal 11.

The DPE store 2 has reading means 21 such as a film reader for obtaining image data S by reading images from a film F brought in by the user 1 and writing means 22 such as a CD-R drive for writing in a CD-R the image data S that have been read and agency information J for designation of the DPE store 2 as an agency to receive the prints P. Viewer software for browsing through and manipulating the image data S and for ordering the prints P is also written in the CD-R. The agency information J is written as computer-readable magnetic information in the CD-R.

The printing-order reception center 3 has an order reception server 31 for receiving a printing order and a printer 32 for obtaining the prints P based on the image data S transferred from the user terminal 11 via the network 4 at the time of ordering the prints, and an agency database 33 for storing the agency information J in relation to agency address information K. Paper KP having an address of the agency printed thereon by the printer 32 is obtained in the reception center 3, based on the address information K. In this manner, the printing-order reception center 3 can deliver the prints P to the agency represented by the agency information J, by pasting the paper KP on a bag containing the prints P, for example.

The user 1 sets the CD-R in a CD-R drive of the user terminal 11 after receiving the CD-R from the DPE store 2, and installs the viewer software recorded in the CD-R in the user terminal 11. In this manner, the user 1 can browse through and manipulate the image data S and can order the prints P, while using the viewer software. At the time of ordering the prints P, the user terminal 11 accesses the order reception server 31 in the printing-order reception center 3 by using the viewer software, and a print ordering web screen is displayed on the user terminal 11 based on information such as an html file or a Javascript stored in the order reception server 31. The prints P are ordered via the print ordering Web screen.

Figure 2:
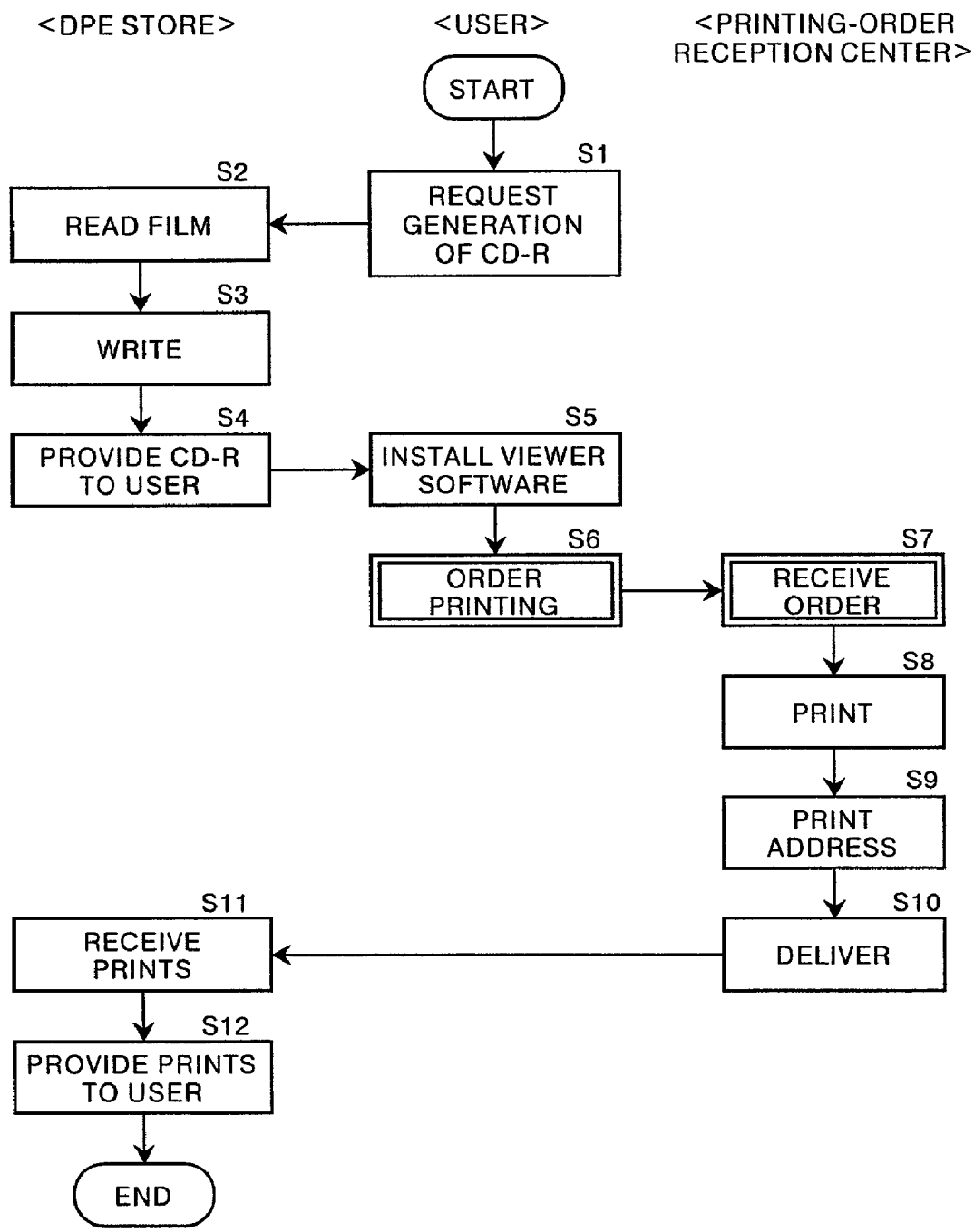
FIG. 2 is a flow chart showing a procedure carried out in the first embodiment.

Operation of the first embodiment will be explained next. FIG. 2 is a flow chart showing a procedure carried out in the first embodiment.

The user 1 requests a CD-R having the image data S representing the images photographed by the user on the film F (Step S1) from the DPE store 2. The DPE store 2 obtains the image data S by reading the film F (Step S2), and writes the image data S and the agency information J in the CD-R, together with the viewer software (Step S3). The CD-R generated in the above manner is provided to the user 1 (Step S4).

The user 1 installs the viewer software in the user terminal 11 (Step S5). The user 1 browses through and manipulates the images and orders the prints P (Step S6). The printing order is sent to the order reception server 31 in the printing-order reception center 3 and received there (Step S7). Hereinafter, the procedure at Step S6 and Step S7 will be explained in detail.

Figure 3:
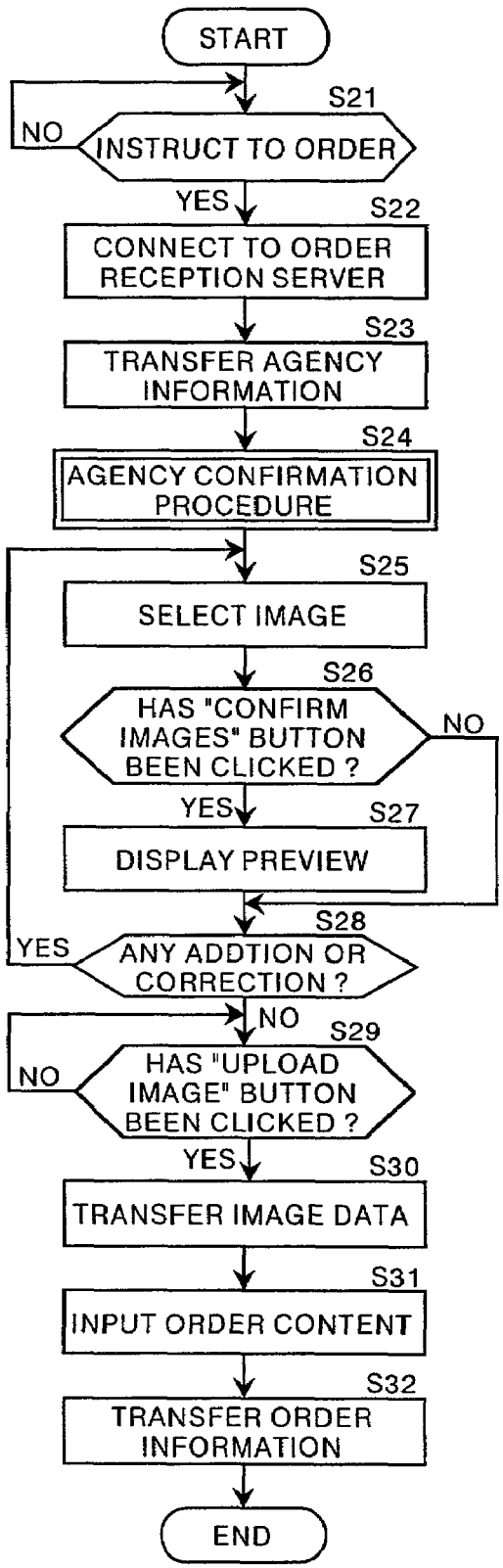
FIG. 3 is a flow chart showing a procedure of ordering a print.

FIG. 3 is a flow chart showing an ordering procedure. When the user 1 instructs the user terminal 11 to order the prints P by using the viewer software (Step S21), the viewer software connects the user terminal 11 to the order reception server 31 in the printing-order reception center 3 via the network 4, by using Web browser software installed in the user terminal 11 (Step S22). At this time, the print ordering Web screen for ordering the prints P is displayed on the user terminal 11, based on the information stored in the order reception server 31. The user 1 inputs information necessary for ordering the prints P such as a user ID and a password in the Web screen, in order to connect the user terminal 11 to the order reception server 31.

The user terminal 11 reads the agency information J from the CD-R and sends the information J to the order reception server 31 (Step S23). The order reception server 31 carries out an agency confirmation procedure after receiving the agency information J from the user terminal 11 (Step S24).

Figure 4:
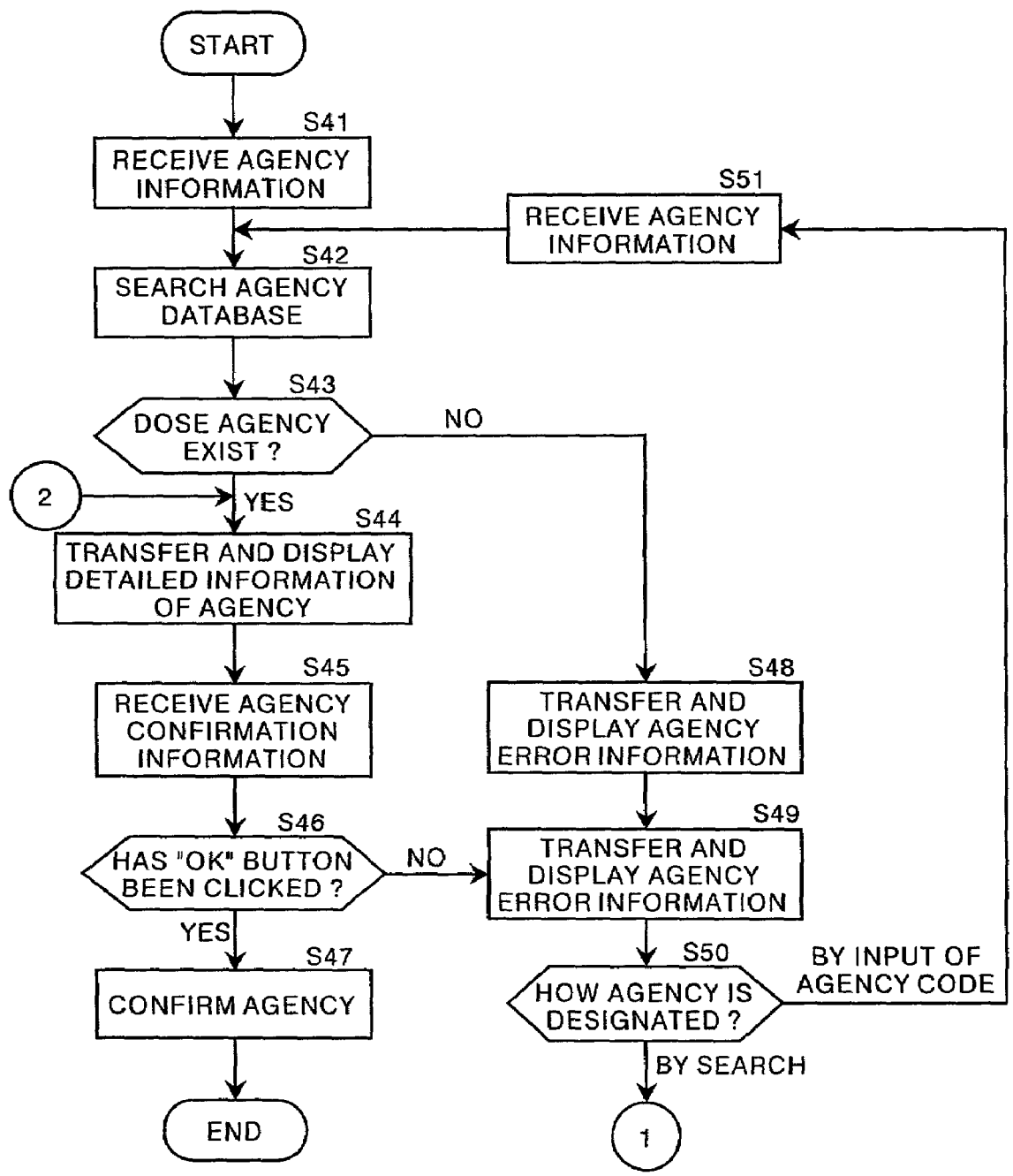
FIG. 4 is a flow chart showing an agency confirmation procedure (part 1)
Figure 5:
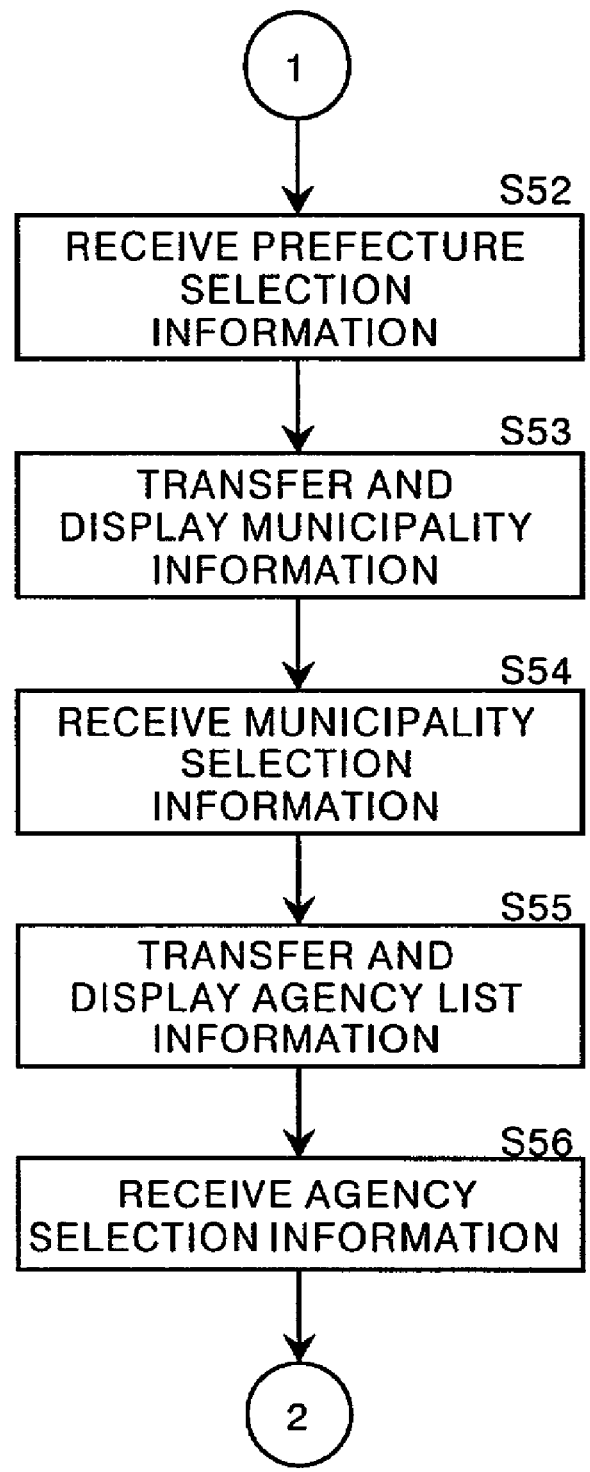
FIG. 5 is a flow chart showing the agency confirmation procedure (part 2)

FIGS. 4 and 5 are flow charts showing the agency confirmation procedure. The order reception server 31 receives the agency information J transferred from the user terminal 11 (Step S41), and searches the agency database 33 based on the agency information J (Step S42). Based on a result of the search, the order reception server 31 judges whether or not the store corresponding to the agency information J exists (Step S43). If the store exists, the order reception server 31 transfers detailed information regarding the store to the user terminal 11, and displays the detailed information on the user terminal 11 (Step S44).

An agency confirmation Web screen 71 including various kinds of the information regarding the store corresponding to the agency information J (such as a name, a zip code, an address, a phone number, a fax number, and operating hours of the store) is displayed on the user terminal 11, as shown in FIG. 6. The user 1 views the Web screen 71 and clicks button 12 if the agency he/she wishes to use is the store displayed therein. Meanwhile, if the user 1 wishes to use another store, the user 1 clicks button 13. Agency confirmation information is then transferred from the user terminal 11 to the order reception server 31, in response to the clicking of button 12 or 13.

The order reception server 31 receives the agency confirmation information (Step S45), and judges whether or not the store displayed in the agency confirmation Web screen 71 is appropriate (Step S46). If a result at Step S46 is affirmative, the store is confirmed as the agency (Step S47).

Figure 7:
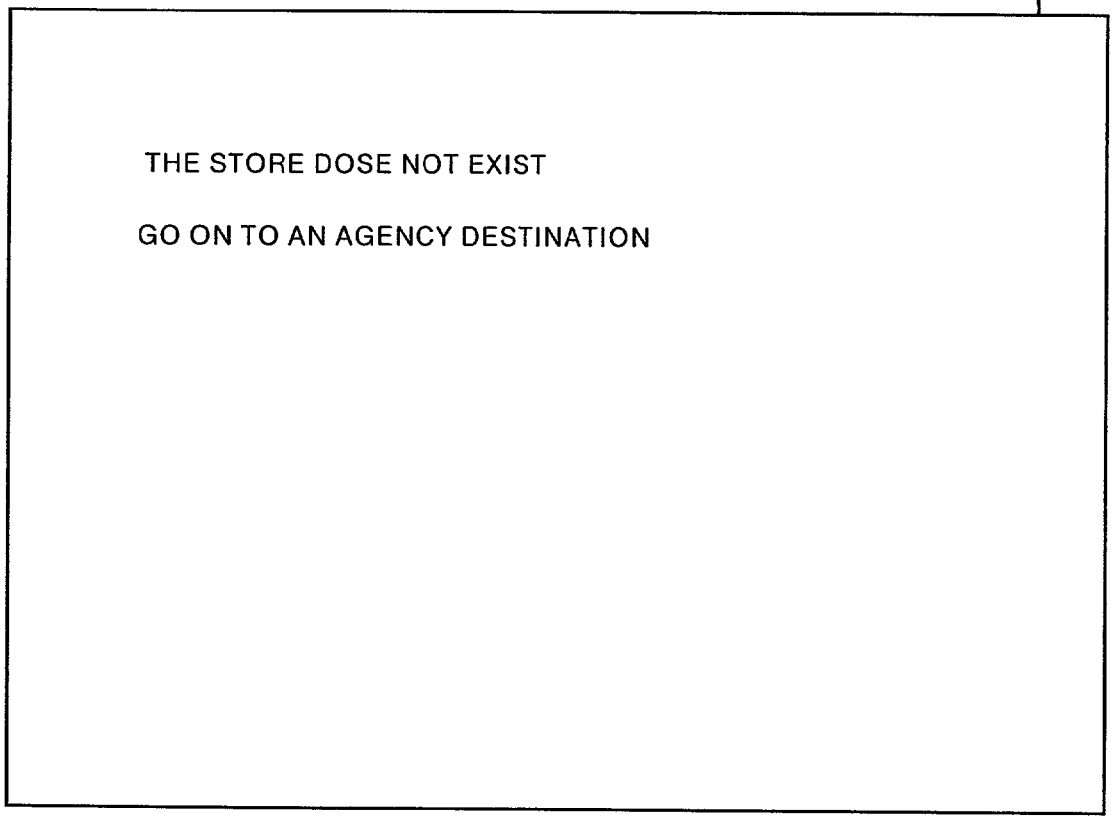
FIG. 7 is a Web screen showing that an agency is not appropriate.

On the other hand, if the result at Step S46 is negative, that is, if the store corresponding to the agency information J does not exist, information indicating this error in agency designation is sent to the user terminal 11. A Web screen 72 for indicating that the store is not appropriate is displayed on the user terminal 11, as shown in FIG. 7 (Step S48). An agency designation Web screen 73 is then transferred from the order reception server 31 and displayed on the user terminal, as shown in FIG. 8 (Step S49). Meanwhile, if the user clicks the button 13 in the agency confirmation Web screen 71 shown in FIG. 6, the agency designation Web screen 73 shown in FIG. 8 is also displayed on the user terminal 11. In the agency designation Web screen 73, a prefecture is selected from a pull-down menu.

The user 1 selects either a search based on the prefecture or a direct input of an agency code, and clicks either button 14 or button 15 depending on the method of selection. Information indicating how the agency is designated is transferred to the order reception server 31 in response to the clicking of button 14 or 15. The order reception server 31 judges how the agency is designated (Step S50). If the user 1 directly inputs a numerical code (the agency code) as the agency information J and clicks the button 15, the order reception server 31 judges that the agency is designated by the agency code. The agency code that has been input is received as the agency information J (Step S51), and the procedure returns to Step S42. The agency code has been provided to the user 1 in advance.

Meanwhile, in order to search for the agency based on the prefecture, the user 1 selects the prefecture from the pull-down menu and clicks the button 14. The order reception server 31 judges that the agency is designated by the search based on the prefecture, and receives prefecture selection information regarding the selected prefecture (Step S52, see FIG. 5). Based on the prefecture selection information, the order reception server 31 searches the agency database 33 for municipality information regarding municipalities in which stores as candidates for the agency are located, and transfers the municipality information to the user terminal 11 to be displayed thereon (Step S53). A municipality selection Web screen 74 is displayed on the user terminal 11, as shown in FIG. 9. In this embodiment, "Yokohama" and "Kawasaki" are displayed in the municipality selection Web screen 74 as the municipalities having the stores therein, since the prefecture selection is "Kanagawa".

In the municipality selection Web screen 74, if the user 1 selects a desired one of the municipalities and clicks on the name thereof, municipality selection information regarding the selected municipality is transferred to the order reception server 31. In this embodiment, "Yokohama" is selected. The order reception server 31 receives the municipality selection information (Step S54), and searches the agency database 33 for the detailed information of the stores in the selected municipality. A list of the stores is then transferred from the order reception server 31 to the user terminal 11 and displayed thereon (Step S55). In this manner, an agency selection Web screen 75 showing detailed information of the stores is displayed on the user terminal 11, as shown in FIG. 10. Since the selected municipality is Yokohama in this embodiment, the list of the stores in Yokohama is displayed in the Web screen 75.

The user 1 selects a desired one of the stores and clicks on the name thereof. Agency selection information regarding the selected store is then sent to the order reception server 31. In this embodiment, "Yanagida Camera" is selected. The order reception server 31 receives the agency selection information (Step S56), and transfers detailed information of the selected store to the user terminal 11 to be displayed thereon (Step S44 in FIG. 4).

The procedure from Step S45 to Step S46 is then carried out as has been described above, and the agency is confirmed at Step S47 if the result at Step S46 is affirmative. Meanwhile, if the result at Step S46 is negative, the procedure goes to Step S49, and the procedure from Step S50 to Step S56 is repeated until the agency is confirmed.

When the agency is confirmed, an image uploading Web screen 76 is displayed on the user terminal 11, as shown in FIG. 11. The image data S representing any of the images to be printed are uploaded (transferred) to the order reception server 31 via the Web screen 76. File name input fields 61 enabling up to ten inputs of image file names are displayed in the image uploading Web screen 76. Reference buttons 62 for displaying a file selection dialog box are also displayed in the Web screen 76 so that one of the file names is selected from the box. A "confirm images" button 16 for image preview, and an "upload images" button 17 for uploading the image data S are also shown in the Web screen 76.

Figure 12:
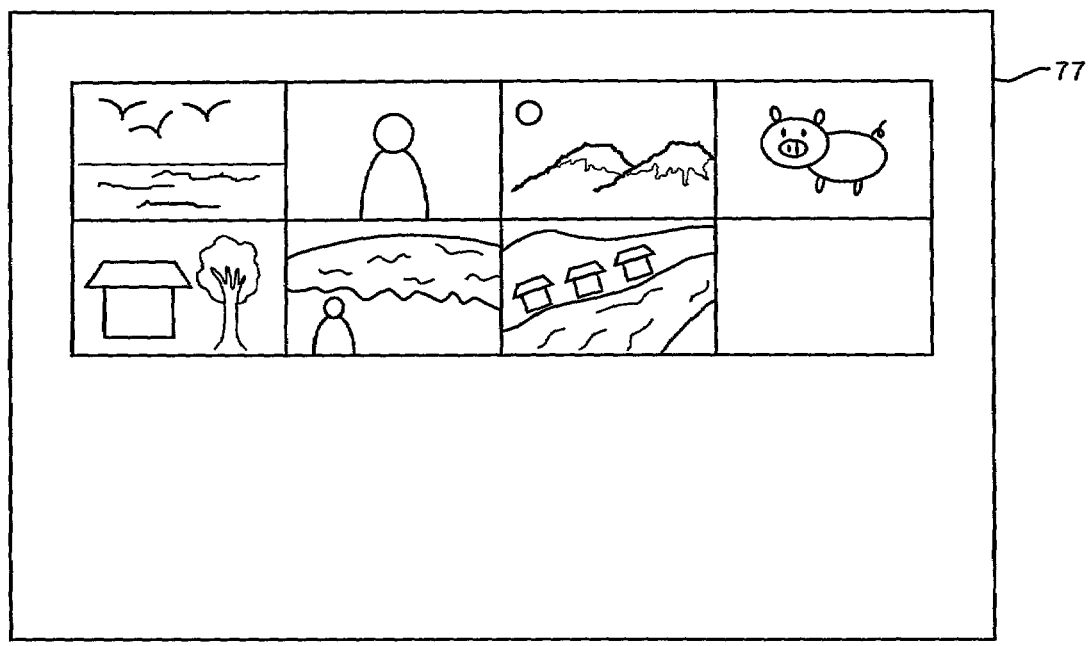
FIG. 12 shows an image preview Web screen.

In the image uploading Web screen 76, the user 1 selects a desired one of the images to be printed, one by one. More specifically, the user 1 may directly input one of the file names in one of the file name input fields 61. Alternatively, the user 1 may click one of the reference buttons 62 to display the file selection dialog box, and selects one of the file names from the box (Step S25). If the number of the images to be printed is not one, the file names can be input at random. Whether or not the "confirm images" button 16 in the Web screen 76 has been clicked is then judged (Step S26). If a result at Step S26 is affirmative, a preview Web screen 77 in which the selected images (or the selected image if the number of the images to be printed is one: hereinafter, the number of the images to be printed is not one in this embodiment.) are shown is displayed, as shown in FIG. 12 (Step S27). It is preferable for the preview Web screen 77 to be displayed in a window different from a window of the image uploading Web screen 76. The selected images in the preview Web screen 76 may be displayed in order of input or in order of the file names. After the preview Web screen 77 is displayed or in the case where the result at Step S26 is negative, whether or not addition to the images or correction of the images is necessary for uploading is then judged (Step S28). If addition or correction is necessary, the procedure returns to Step S25 and the procedure from Step S25 to Step S28 is repeated. If addition or correction is unnecessary, the user 1 clicks the "upload images" button 17 in the image uploading Web screen 76 (Step S29), and the image data S for the selected images are transferred to the order reception server 31 (Step S30).

After the uploading is completed, an order content input Web screen 78 is displayed on the user terminal 11, as shown in FIG. 13. The order content input Web screen 78 displays a charge per print in accordance with print size, numbers representing the uploaded images, thumbnail images and the file names of the uploaded images, time and date of the uploading, print size selection fields 63, and print quantity input fields 64. The uploaded images are displayed in order of the file names. The user 1 can confirm the uploaded images, the file names, and the time and date of the uploading, by viewing the Web screen 78. Meanwhile, a pull-down menu is available for the print size selection fields 63, and print sizes such as an L size (with white margin/without eclipse), an L size (without white margin/with eclipse), a DSC size, a DSCW size, and a 2L size can be selected, for example. Quantities can be input directly in the print quantity input fields 64 for the respective images that have been uploaded.

Figure 14:
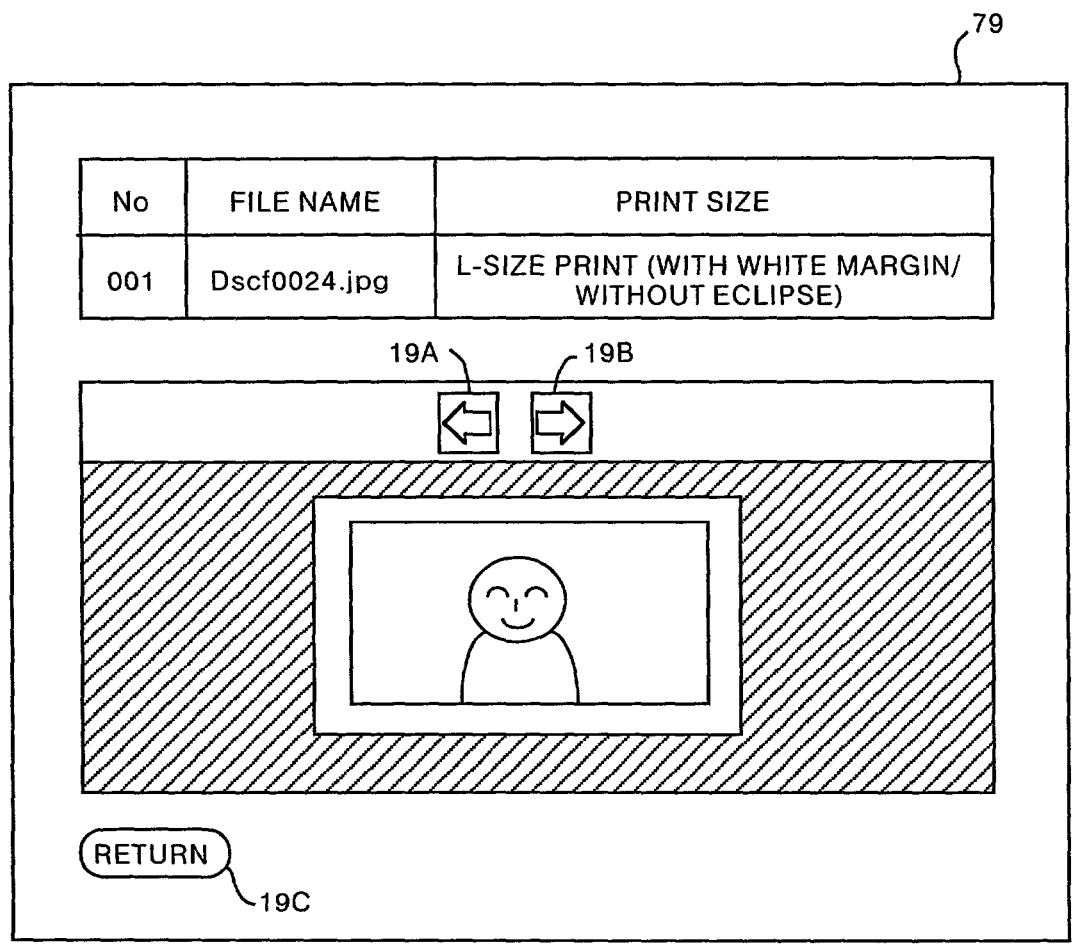
FIG. 14 shows a Web screen for previewing an image that has been selected.

If the user 1 clicks on one of the thumbnail images after selection of the print sizes for all the uploaded images, the user can confirm the image numbers, the file names, the print sizes, and how the prints P look one by one for all the uploaded images, by using a preview Web screen 79 displayed as shown in FIG. 14 in response to the clicking. In this example, the user has clicked on an image 001 in the L size (with white margin/without eclipse). As shown in FIG. 14, in the preview Web screen 79, the image 001 having the white margin in the L size is displayed. By clicking an arrow button 19B in the preview Web screen 79, the user can preview the next uploaded image. If the user clicks an arrow button 19A, the preview returns to that of the previous image. By clicking a "Return" button 19C, the order content input Web screen 78 shown in FIG. 13 is displayed again.

The user 1 inputs the content of the order in the order content input Web screen 78 (Step S31), and clicks an "confirm order" button 18. The content of the order is then sent to the order reception server 31 as order information (Step S32), and the ordering procedure ends.

The order reception server 31 in the printing-order reception center 3 receives the order information (Step S7 in FIG. 2), and prints the image data S based on the order information to obtain the prints P (Step S8). The paper KP on which the address information K of the agency is printed is obtained based on the agency information J (Step S9). The paper KP is pasted on a bag containing the prints P, and the prints P are delivered to the address thereon (Step S10). The agency receives the prints P (Step S11), and the user 1 goes to the agency to receive the prints P by paying the charge (Step S12). In this manner, the procedure ends.

As has been described above, in this embodiment, the agency information J written in the CD-R is transferred to the order reception server 31 at the time of ordering the prints. Therefore, the user 1 can designate the agency to receive the prints P, without carrying out a troublesome operation. In this manner, the prints P can be ordered easily. Meanwhile, the DPE store 2 can lead the user 1 to designate the store as the agency, by providing the agency information J representing the store. Therefore, the DPE store 2 can increase profit.

Figure 15:
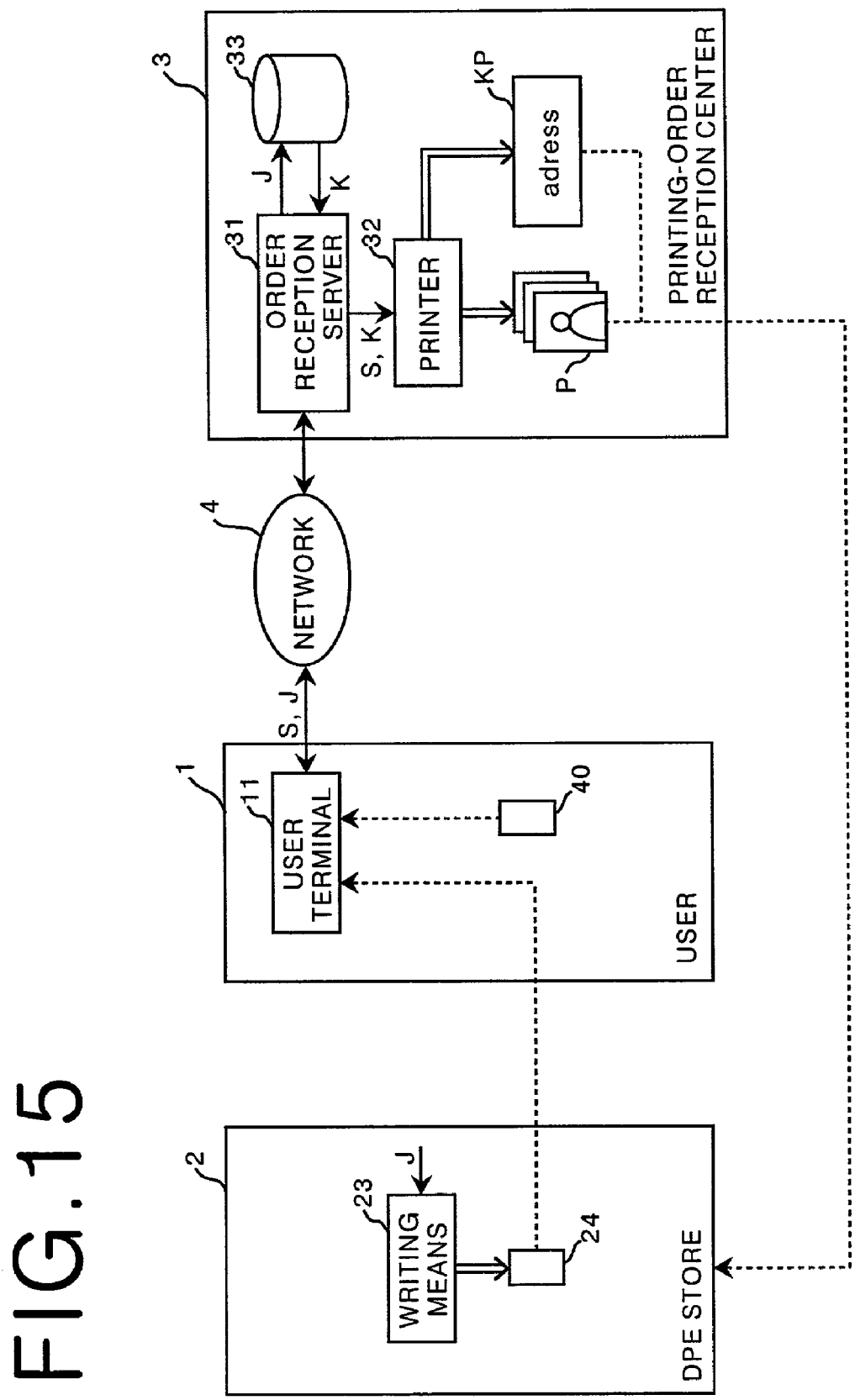
FIG. 15 is a block diagram showing a configuration of a network photograph service system adopting a print ordering system as a second embodiment of the present invention.

Operation of a second embodiment of the present invention will be explained next. FIG. 15 is a block diagram showing a configuration of a network photograph service system adopting a print ordering system as the second embodiment of the present invention. In the second embodiment, elements that are the same as in the first embodiment have the same reference numbers and detailed explanations thereof are omitted.

In the second embodiment, a DPE store 2 has writing means 22 for writing agency information J in a recording medium 24 such as a magnetic card, an IC card and an FD. The recording medium is provided to a user 1 and the user 1 reads the agency information J from the recording medium 24 by using a user terminal 11. The agency information J is sent to an order reception server 31 in a printing-order reception center 3. The user 1 orders prints P of image data S (recorded in a memory card 40) obtained by using a digital camera.

In the case where the agency information J is written in the recording medium 24, the user 1 sets the recording medium 24 in a card reader or an FD drive connected to the user terminal 11. When the user 1 instructs the user terminal 11 to order the prints P at Step S21 in FIG. 3, the user terminal 11 accesses the order reception server 31 and reads the agency information J from the recording medium 24. The agency information J that has been read is sent to the order reception server 31. Thereafter, the agency confirmation procedure shown in FIGS. 4 and 5 is carried out as in the first embodiment. The image data S are read from the memory card 40 and uploaded.

Figure 16:
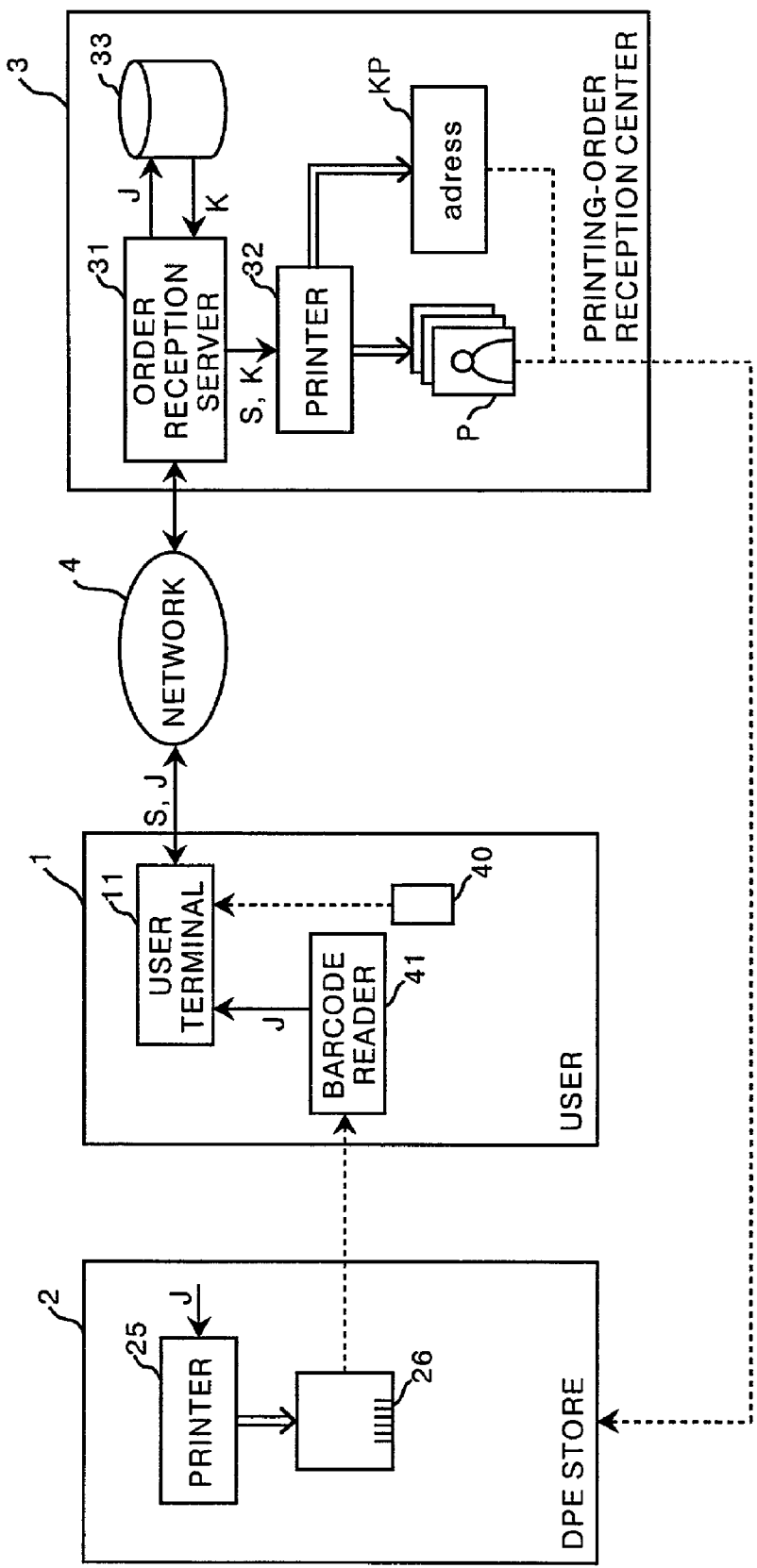
FIG. 16 is a block diagram showing a configuration of a network photograph service system adopting a print ordering system as a third embodiment of the present invention.

Operation of a third embodiment of the present invention will be explained next. FIG. 16 is a block diagram showing a configuration of a network photograph service system adopting a print ordering system as the third embodiment of the present invention. In the third embodiment, elements that are the same as in the first embodiment and the second embodiment have the same reference numbers and detailed explanations thereof are omitted.

In the third embodiment, each of DPE stores 2 has a printer 25 for printing agency information J as a bar code or a numerical code on a printing medium 26 such as a leaflet or a card. Each of the DPE stores 2 provides the printing medium 26 to a user 1 and the user 1 can read the agency information J printed on the printing medium 26 by using reading means connected to a user terminal 11. The agency information J read in the above manner is sent to an order reception server 31 in a printing-order reception center 3. The user 1 orders prints P of image data S (recorded in a memory card 40) obtained by using a digital camera. In the third embodiment, the agency information J is printed on the printing medium 26 as the bar code and a bar code reader 41 is used as the reading means.

As has been described above, in the case where the agency information J is printed as the bar code on the printing medium 26, the user 1 can read the bar code by using the bar code reader 41 connected to the user terminal 11, and obtains the agency information J. When the user 1 instructs the user terminal 11 to order the prints P at Step S21 in FIG. 3, the user terminal 11 accesses the order reception server 31 and sends the agency information J that has been read to the order reception server 31. Thereafter, the agency confirmation procedure shown in FIGS. 4 and 5 is carried out as in the first embodiment. The image data S are read from the memory card 40 and uploaded.

In the third embodiment, by viewing the agency information printed on the leaflet or the like, the user 1 can designate any one of the DPE stores 2 charging less or providing a better service as an agency to receive the prints P. In this manner, the user 1 can receive better service. Meanwhile, each of the DPE stores 2 can attract the user 1 as a customer who designates the store as the agency. Therefore, each of the DPE stores 2 can increase their profit.

In the third embodiment, if a numerical code is printed on the printing medium 26 as the agency information J, the numerical code is read by OCR means. Recently, a method of detecting information such as a number and a bar code included in an image obtained by a digital camera has been proposed. In the third embodiment, the user 1 may photograph the printing medium 26 with such a digital camera so that the agency information J included in the photographed image can be detected and transferred to the order reception server 31 according to this method.

Figure 17:
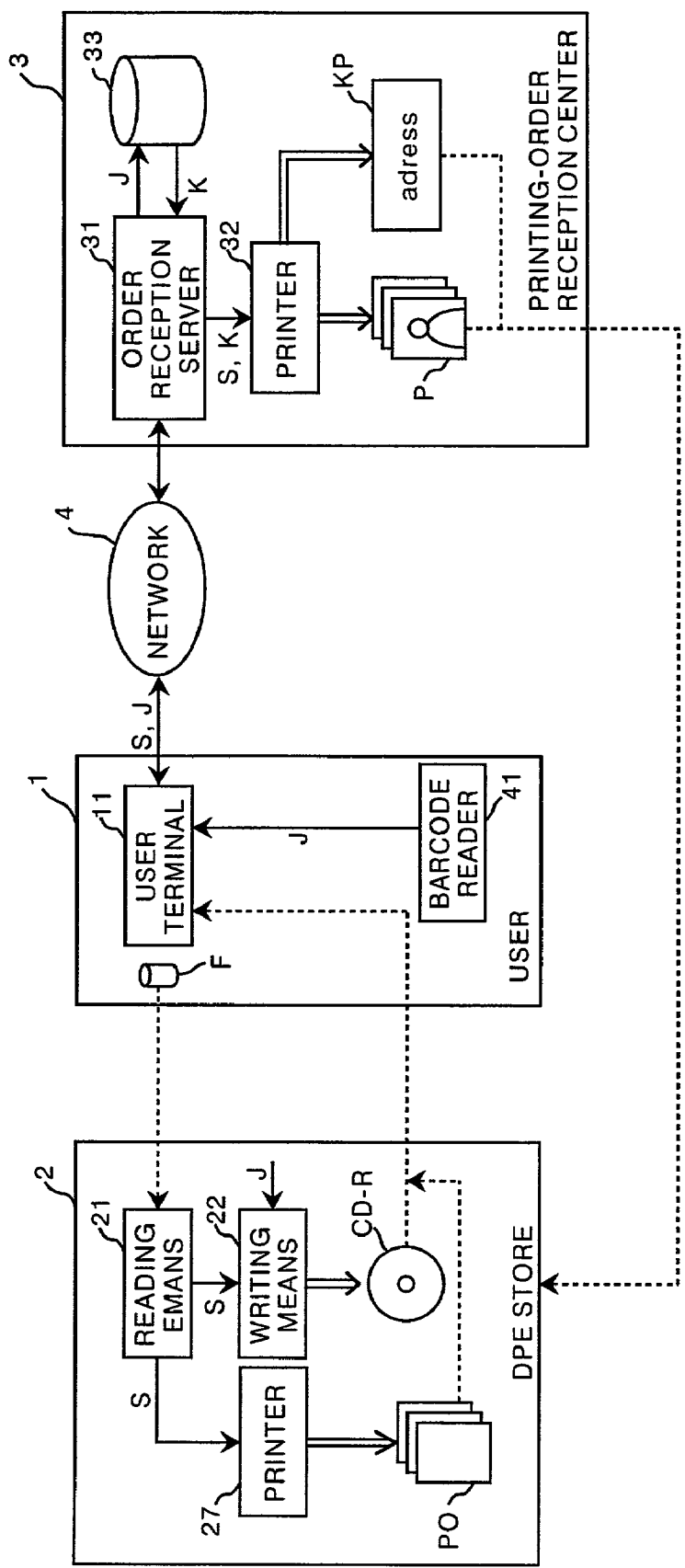
FIG. 17 is a block diagram showing a configuration of a network photograph service system adopting a print ordering system as a fourth embodiment of the present invention.

A fourth embodiment of the present invention will be explained next. FIG. 17 is a block diagram showing a configuration of a network photograph service system adopting a print ordering system as the fourth embodiment of the present invention. In the fourth embodiment, elements that are the same as in the first to third embodiments have the same reference numbers and detailed explanations thereof are omitted.

In the fourth embodiment, a DPE store 2 writes image data S in a CD-R and prints the image data S by using a printer 27. The DPE store 2 provides prints P0 of the image data S together with the CD-R to a user 1. Agency information J is printed as a bar code or a numerical code on a backside of each of the prints P0. Meanwhile, the user 1 reads the agency information J printed on the backside of any one of the prints P0 with reading means connected to a user terminal 11, and transfers the agency information J to an order reception server 31 in a printing-order reception center 3. The user 1 also orders prints P of the image data S recorded in the CD-R. In the fourth embodiment, the agency information J is printed as a bar code on the backside of each of the prints P0 and a bar code reader 41 is used as the reading means. The agency information J may be printed on the backside of photographic paper for the prints P0 in advance. Alternatively, the agency information J may be printed on the backside of each of the prints P0 after generation of the prints P0.

As has been described above, in the case where the agency information J is printed on the backside of each of the prints P0 as the bar code, the user 1 reads the bar code with the bar code reader 41 connected to the user terminal 11, and obtains the agency information J. When the user 1 instructs the user terminal 11 to order the prints P at Step S21 in FIG. 3, the user terminal 11 accesses the order reception server 31 and sends the agency information J that has been read to the order reception server 31. Thereafter, the agency confirmation procedure shown in FIGS. 4 and 5 is carried out as in the first embodiment, and the prints P are ordered.

In the fourth embodiment, if the agency information J is printed on the backside of each of the prints P0 as a numerical code, the numerical code is read by OCR means. Recently, a method of detecting information such as a number and a bar code included in an image obtained by a digital camera has been proposed. In the fourth embodiment, the user 1 may read the agency information J with such a digital camera.

Figure 18:
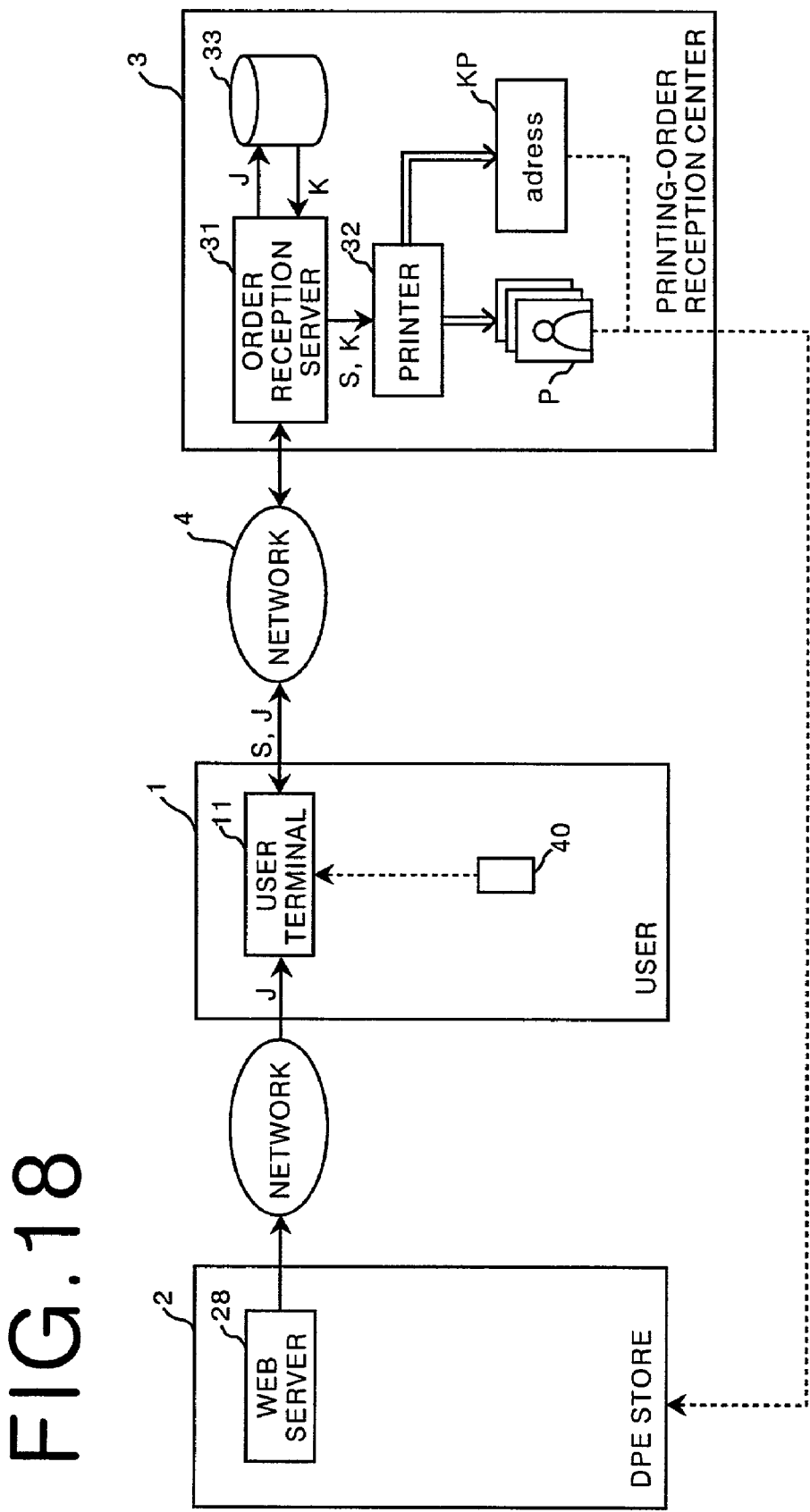
FIG. 18 is a block diagram showing a configuration of a network photograph service system adopting a print ordering system as a fifth embodiment of the present invention.

A fifth embodiment of the present invention will be explained next. FIG. 18 is a block diagram showing a configuration of a network photograph service system adopting a print ordering system as the fifth embodiment of the present invention. In the fifth embodiment, elements that are the same as in the first to fourth embodiments have the same reference numbers and detailed explanations thereof are omitted.

In the fifth embodiment, agency information J is obtained from a Web server 28, and a user 1 orders prints P of image data S (recorded in a memory card 40) obtained by photographing with a digital camera. In other words, each of DPE stores 2 has a Web site of its own, and the user 1 accesses the Web server 28 from a user terminal 11 via a network 4, in order to browse through the Web site. The Web site includes an advertisement showing a charge and the content of services, and a button to download the agency information J. The user 1 accesses the Web server 28 corresponding to any one of the DPE stores 2, and selects one of the DPE stores 2 as desired. The user 1 obtains the agency information J by downloading the agency information J of the selected DPE stores 2.

After the user 1 obtains the agency information J in the above manner, the user 1 instructs the user terminal to order the prints P at Step S21 in FIG. 3. The user terminal 11 accesses an order reception server 31 and sends the agency information J that has been read to the order reception server 31. Thereafter, the agency confirmation procedure shown in FIGS. 4 and 5 is carried out as in the first embodiment, and the prints P are ordered.

As has been described above, by obtaining the agency information J from the Web server 28 of any one of the DPE stores 2 after the user 1 confirms the charge and the content of the services for each of the stores 2 via the Internet, the user 1 can select the desired one of the stores 2 as an agency to receive the prints P. Each of the DPE stores 2 can also improve an effect of the advertisement using the Web site.

Figure 19:
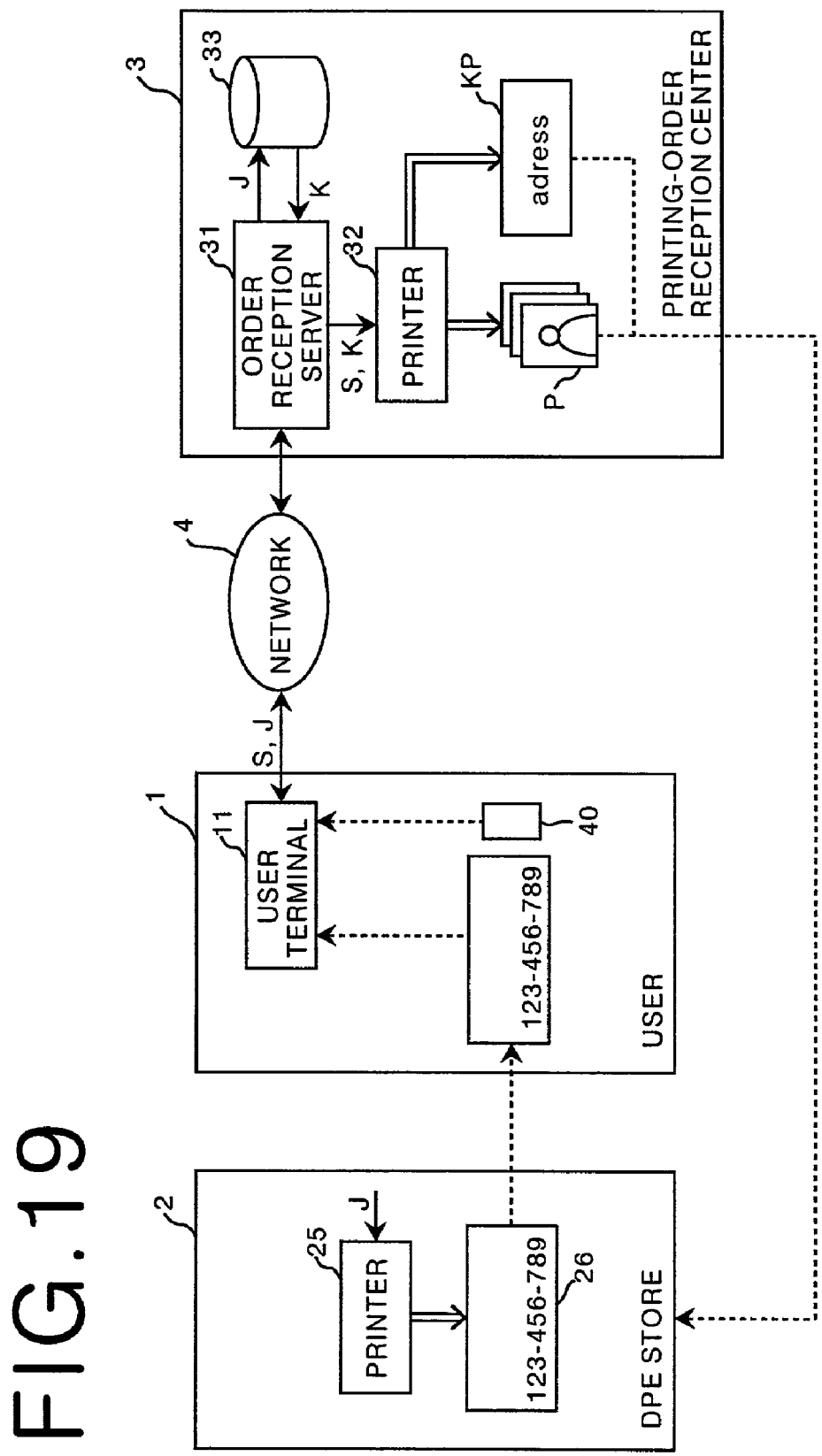
FIG. 19 is a block diagram showing a configuration of a network photograph service system adopting a print ordering system as a sixth embodiment of the present invention.

A sixth embodiment of the present invention will be explained next. FIG. 19 is a block diagram showing a configuration of a network photograph service system adopting a print ordering system as the sixth embodiment of the present invention. In the sixth embodiment, elements that are the same as in the first to fifth embodiments have the same reference numbers and detailed explanations thereof are omitted.

Figure 20:
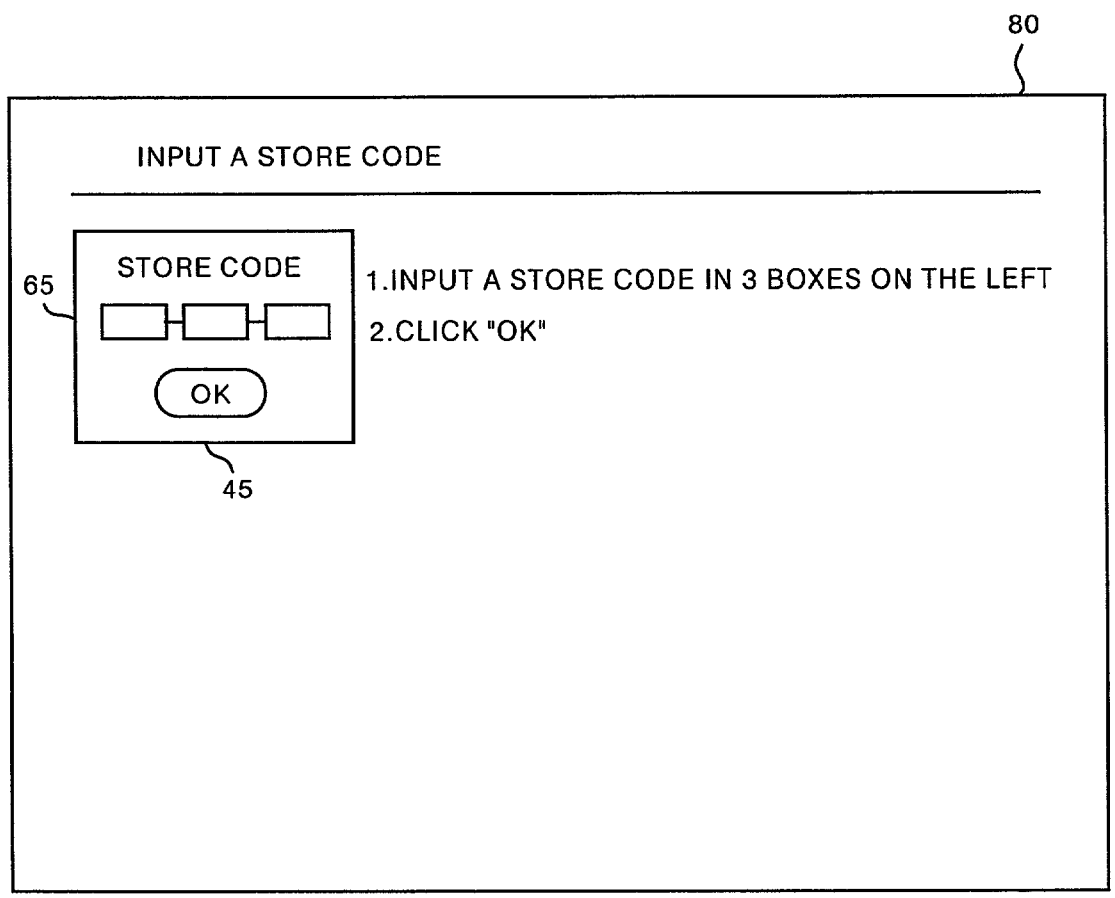
FIG. 20 shows a code input web screen.

In the sixth embodiment, each of DPE stores 2 has a printer for printing agency information J on a printing medium 26 such as a leaflet, a card, and an advertisement, as in the third embodiment. However, the agency information J is printed on the printing medium 26 as a numerical code (a store code). Furthermore, in the sixth embodiment, when a user 1 instructs a user terminal 11 to order prints P by using viewer software, a code input Web screen 80 to input the store code is displayed on the user terminal 11, as shown in FIG. 20. The user 1 inputs the numerical code printed on the printing medium 26 in a code input field 65 in the Web screen 80. When the user 1 clicks an OK button 45, the store code is transferred as the agency information J to an order reception server 31. Thereafter, the agency confirmation procedure shown in FIGS. 4 and 5 is carried out as in the first embodiment and the prints P are ordered. Image data S are read from a memory card 40 and uploaded.

In the sixth embodiment, by viewing the agency information J printed on the printing medium 26 such as the leaflet and the advertisement, the user 1 can designate any one of the DPE stores 2 charging less or providing a better service as an agency. In this manner, the user 1 can receive better service. Meanwhile, each of the DPE stores 2 can attract the user 1 as a customer who designates the store as the agency. Therefore, each of the DPE stores 2 can increase their profit.

Figure 21:
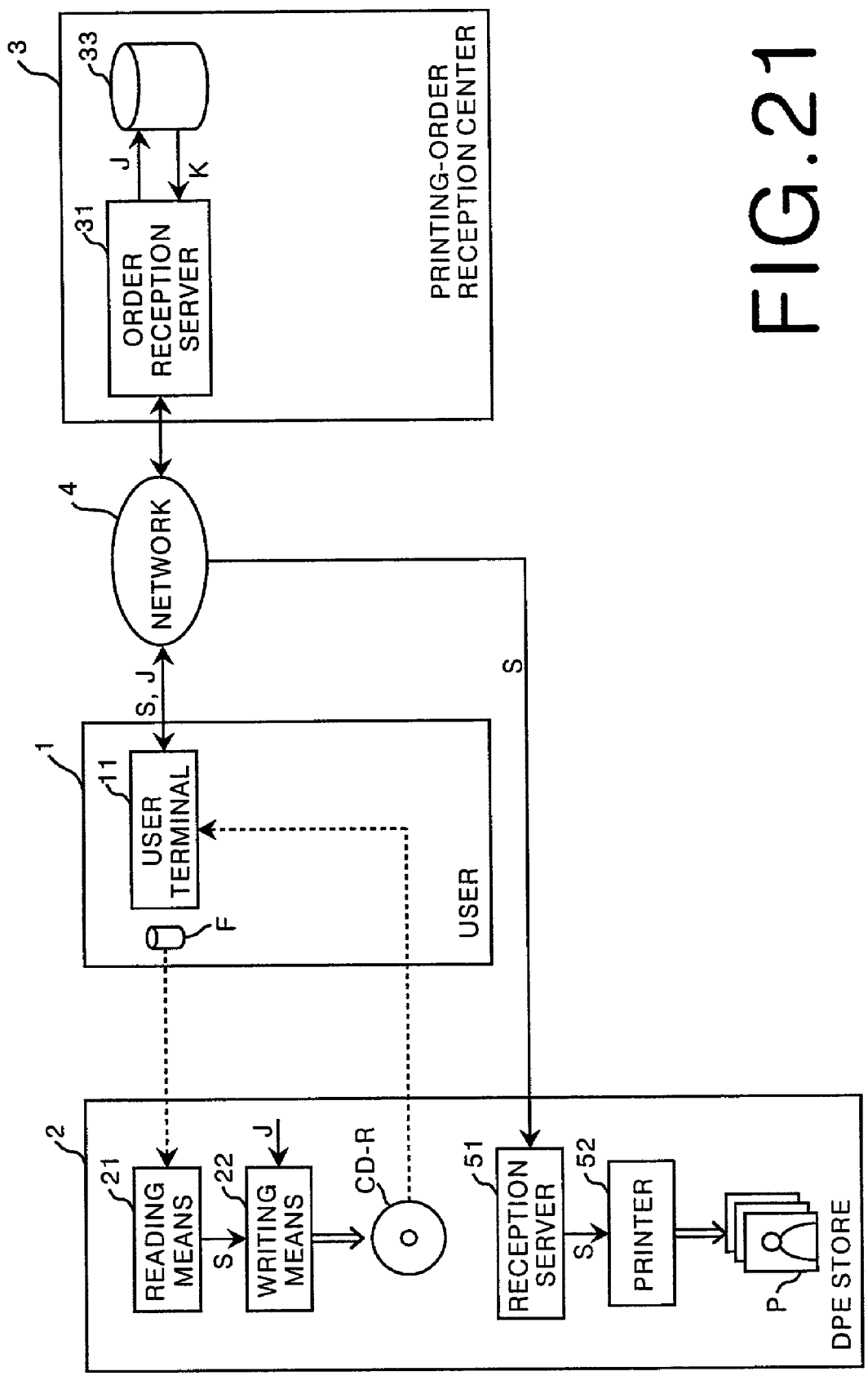
FIG. 21 is a block diagram showing a configuration of a network photograph service system adopting a print ordering system as a seventh embodiment of the present invention.

A seventh embodiment of the present invention will be explained next. FIG. 21 is a block diagram showing a configuration of a network photograph service system adopting a print ordering system as the seventh embodiment of the present invention. In the seventh embodiment, elements that are the same as in the first to sixth embodiments have the same reference numbers and detailed explanations thereof are omitted.

In the first to sixth embodiments, the printing-order reception center 3 receives the order from the user 1 and prints the image data S. In the seventh embodiment, a DPE store 2 as in the first embodiment of the network photograph service system prints image data S, although the DPE stores 2 in the first to sixth embodiments can also carry out the printing.

In the seventh embodiment, a printing-order reception center 3 has an order reception server 31 and an agency database 33. The DPE store 2 has a reception server 51 for receiving the image data S transferred from the order reception server 31 and a printer 52 for obtaining prints P by printing the image data S.

In the seventh embodiment, the order reception server 31 receives the image data S after confirmation of an agency, and transfers the image data S via a network 4 to the DPE store 2 searched for according to the agency information J. The reception server 51 in the DPE store 2 receives the image data S and prints the image data S to obtain the prints P by using the printer 52.

In the first embodiment, the image data S and the agency information J are written in the CD-R. However, the agency information J may be written in a file header of the image data S. For example, if the image data S are stored in a JPEG file, the agency information J is written in a tag thereof. By writing the agency information J in the file header of the image data S as in the above manner, the agency information J can be transferred to the order reception server 31 after being read from the file of the image data S, even in the case where the image data S are stored in a hard disc of the user terminal 11 after being read from the CD-R.

Alternatively, only the image data S may be written in the CD-R, whereas the agency information J may be stored in the recording medium 24 such as a magnetic card as in the second embodiment, or printed on the printing medium 26 as in the third embodiment.

What is claimed is:

1. A print ordering method used for a print ordering system comprising an order reception server for receiving an order of a print of image data, and a user terminal connected to the order reception server via a network and for ordering the print of the image data from the order reception server, the image data to be printed being transferred from the user terminal to the order reception server, the print ordering method comprising the step of:

providing agency information to a user in advance, the agency information specifying one or more agencies at which the user is able to receive the print, transferring the agency information from the user terminal to the order reception server, wherein the transferred agency information includes information designating a specific one of the agencies at which the user would like to receive the print, the agency information being recorded as magnetic information in a recording medium together with the image data; and the agency information and the image data to be printed being read from the recording medium by the user terminal and transferred from the user terminal to the order reception server.

2. A print ordering method used for a print ordering system comprising an order reception server for receiving an order of a print of image data, and a user terminal connected to the order reception server via a network and for ordering the print of the image data from the order reception server, the image data to be printed being transferred from the user terminal to the order reception server, the print ordering method comprising the step of:

providing agency information to a user in advance, the agency information specifying one or more agencies at which the user is able to receive the print, transferring the agency information from the user terminal to the order reception server, wherein the transferred agency information includes information designating a specific one of the agencies at which the user would like to receive the print, the agency information being printed on a printing medium, and the agency information being read from the printing medium by the user terminal and transferred from the user terminal to the order reception server.

3. A print ordering method used for a print ordering system comprising an order reception server for receiving an order of a print of image data, and a user terminal connected to the order reception server via a network and for receiving the print of the image data from the order reception server, the image data to be printed being transferred from the user terminal to the order reception server, the print ordering method comprising the step of:

provided agency information to a user in advance, the agency information specifying one or more agencies at which the user is able to receive the print, transferring the agency information from the user terminal to the order reception server, wherein the transferred agency information includes information designating a specific one of the agencies at which the user would like to receive the print, the agency information being recorded as magnetic information in a recording medium; and the agency information being read from the recording medium by the user terminal and transferred from the user terminal to the order reception server.

4. A print ordering method as defined in claim 3, wherein the agency information is obtained from a predetermined web server by the user terminal and transferred from the user terminal to the order reception server.

5. a print ordering method as defined in claim 3, wherein the agency information is a code number representing the agency input from the user terminal.

6. A print ordering method as defined in claim 3, wherein the agency information is added to the image data.

7. A print ordering method as defined in claim 3, further comprising the steps of:

displaying an order reception web screen on the user terminal based on information stored in the order reception server; and ordering the print via the order reception web screen.

8. A print ordering method as defined in claim 7, further comprising the step of:

displaying an agency confirmation web screen on the user terminal based on the information stored in the order reception server after the user terminal transfers the agency information.

9. A print ordering method as defined in claim 8, further comprising the steps of:

receiving an input of information representing whether or not the agency information is appropriate in the agency confirmation web screen;

displaying a selection web screen for selecting the agency on the user terminal based on the information stored in the order reception server in the case where the agency information is not appropriate; and using information of the agency selected in the selection web screen as the agency information.

10. A print ordering method as defined in claim 3, wherein the agency information is provided to the user by a DPE store or a web server separate from the order reception server.

11. A print ordering method as defined in claim 3, wherein the specific one of the agencies at which the user would like to receive the print is any one of a plurality of separate agencies.

12. A print ordering method as defined in any one of claims 1 to 9, further comprising the step of:

transferring order information representing the content of the order from the user terminal to the order reception server.

13. A print ordering system, comprising:

an order reception server for receiving an order of a print of image data;

agency information provided to a user by a first party in advance, the agency information specifying one or more agencies at which the user is able to receive the print; and a user terminal connected to the order reception server operable by a second party via a network and for ordering the print of the image data from the order reception server, the image data to be printed being sent from the user terminal to the order reception server at the time of ordering the print, wherein the user terminal transfers the agency information to the order reception server, the transferred agency information including information designating a specific one of the agencies at which the user would like to receive the print, and wherein the agency information is recorded in a recording medium together with the image data, and the user terminal transfers the agency information and the image data to be printed to the order reception server by reading the image data and the agency information from the recording medium.

14. A print ordering system, comprising:

an order reception server for receiving an order of a print of image data;

agency information provided to a user by a first party in advance, the agency information specifying one or more agencies at which the user is able to receive the print; and a user terminal connected to the order reception server operable by a second party via a network and for ordering the print of the image data from the order reception server, the image data to be printed being sent from the user terminal to the order reception server at the time of ordering the print, wherein the user terminal transfers the agency information to the order reception server, the transferred agency information including information designating a specific one of the agencies at which the user would like to receive the print, and wherein the agency information is recorded as magnetic information in a recording medium and the user terminal transfers the agency information to the order reception server by reading the information from the recording medium.

15. A print ordering system, comprising:

an order reception server for receiving an order of a print of image data;

agency information provided to a user by a first party in advance, the agency information specifying one or more agencies at which the user is able to receive the print; and a user terminal connected to the order reception server operable by a second party via a network and for ordering the print of the image data from the order reception server, the image data to be printed being sent from the user terminal to the order reception server at the time of ordering the print, wherein the user terminal transfers the agency information to the order reception server, the transferred agency information including information designating a specific one of the agencies at which the user would like to receive the print, and wherein the agency information is printed on a printing medium and the user terminal transfers the agency information to the order reception server by reading the agency information printed on the printing medium.

16. A print ordering system as defined in claim 14, wherein the agency information is obtained from a predetermined web server and the user terminal transfers the agency information that has been obtained to the order reception server.

17. A print ordering system as defined in claim 14, wherein the agency information is a code number representing the agency and input from the user terminal.

18. A print ordering system as defined in claim 14, wherein the agency information is added to the image data and the user terminal transfers the agency information to the order reception server by reading the agency information added to the image data.

19. A print ordering method as defined in claim 14, wherein the user terminal displays an order reception web screen based on information stored in the order reception server and orders the print via the order reception web screen.

20. A print ordering system as defined in claim 19, wherein the user terminal displays an agency confirmation web screen based on the information stored in the order reception server after transferring the agency information.

21. A print ordering system as defined in claim 20, the user terminal receiving an input of information representing whether or not the agency information is appropriate in the agency confirmation web screen, the user terminal displaying a selection web screen for selecting the agency based on the information stored in the order reception server in the case where the agency information is not appropriate, and the user terminal using information of the agency selected in the selection web screen as the agency information.

22. A print ordering system as defined in any one of claims 13 to 21, wherein the user terminal further transfers order information representing the content of the order to the order reception server.

23. A print ordering method as defined in claim 14, wherein the first party that provides the agency information to the user is a DPE store or a web server separate from the order reception server operable by the second party.

24. A print ordering method as defined in claim 14, wherein the specific one of the agencies at which the user would like to receive the print is any one of a plurality of separate agencies.

25. A print ordering method used for a print ordering system comprising an order reception server for receiving an order of a print of image data, and a user terminal connected to the order reception server via a network and for ordering the print of the image data from the order reception server, the image data to be printed being transferred from the user terminal to the order reception server, the print ordering method comprising the step of:

transferring agency information, which has been provided to a user in advance regarding an agency for receiving the print, from the user terminal to the order reception server, wherein the agency information is provided to the user by an entity that is separate from the order reception server, the agency information being recorded as magnetic information in a recording medium; and the agency information being read from the recording medium by the user terminal and transferred from the user terminal to the order reception server.

26. A print ordering method used for a print ordering system comprising an order reception server for receiving an order of a print of image data, and a user terminal connected to the order reception server via a network and for ordering the print of the image data from the order reception server, the image data to be printed being transferred from the user terminal to the order reception server, the print ordering method comprising the step of:

transferring agency information, which has been provided to a user in advance regarding an agency for receiving the print, from the user terminal to the order reception server, wherein the agency information is provided to the user by an entity that is separate from the order reception server, the agency information being printed on a printing medium, and the agency information being read from the printing medium by the user terminal and transferred from the user terminal to the order reception server.

27. A print ordering system comprising:

an order reception server for receiving an order of a print of image data; and a user terminal connected to the order reception server operable by a first party via a network and for ordering the print of the image data from the order reception server, the image data to be printed being sent from the user terminal to the order reception server at the time of ordering the print, wherein the user terminal transfers agency information, which has been provided to a user in advance regarding an agency to receive the print, to the order reception server, wherein the agency information is recorded as magnetic information in a recording medium and the user terminal transfers the agency information to the order reception server by reading the information from the recording medium.

28. A print ordering system comprising:

an order reception server for receiving an order of a print of image data; and a user terminal connected to the order reception server operable by a first party via a network and for ordering the print of the image data from the order reception server, the image data to be printed being sent from the user terminal to the order reception server at the time of ordering the print, wherein the user terminal transfers agency information, which has been provided to a user in advance regarding an agency to receive the print, to the order reception server, wherein the agency information is printed on a printing medium and the user terminal transfers the agency information to the order reception server by reading the agency information printed on the printing medium.

* * * * *